United States Patent Office 3,364,188
Patented Jan. 16, 1968

3,364,188
METHOD OF CROSSLINKING 5-METHYLENE-2-NORBORNENE COPOLYMERS
John M. Bruce, Jr., Wilmington, Del., assignor to E. I. du Pont de Nemours and Company, Wilmington, Del., a corporation of Delaware
No Drawing. Filed Aug. 27, 1964, Ser. No. 392,623
5 Claims. (Cl. 260—88.2)

ABSTRACT OF THE DISCLOSURE

Thermoplastic olefin polymers containing 5-methylene 2-norbornene copolymerized therein may be crosslinked by intimately contacting the polymer with a catalyst consisting essentially of a Lewis acid selected from the group consisting of titanium trichloride, zirconium trichloride, tin tetrachloride, tin tetrabromide, aluminum trichloride, boron trifluoride, diborane and aluminum trialkyls at a temperature and for a time sufficient to effect reaction.

---

This invention relates to the manufacture of crosslinked olefin polymers and are more particularly to a method of crosslinking olefin polymers containing 5-methylene norbornene copolymerized therein.

Thermoplastic copolymers of ethylene and 5-methylene-2-norbornene have been described in Canadian Patent 607,108. In United States Patents 3,093,620 and 3,093,621, issued on June 11, 1963 to Gladding et al., there are described sulfur-curable elastomeric compositions comprised of ethylene, α-olefins and 5-methylene-2-norbornene.

It has now been discovered that the above and similar olefin copolymers containing 5-methylene-2-norbornene copolymerized therein, preferably having 0.1 to 12 mole percent of the 5-methylene-2-norbornene comonomer incorporated as a comonomer in the polymer, may be crosslinked by intimately contacting the polymer with a catalyst consisting essentially of a Lewis acid, at a temperature and for a time sufficient to effect reaction.

Lewis acids are well known in the art as acids in the extended sense introduced by G. N. Lewis. According to this view, an acid-base reaction is one in which an unshared electron pair of the base molecular or ion is donated to an acceptor or acid with the formation of a covalent link. Accordingly, a Lewis acid is defined as a molecule or ion having an outer valence electron shell which can extend to accommodate an electron pair donated by a Lewis base.

Examples of Lewis acids which are effective to accomplish the crosslinking reaction of this invention are: titanium trichloride, zirconium trichloride, tin tetrachloride, tin tetrabromide, aluminum trichloride, boron trifluoride, diborane, aluminum trialkyl (the alkyl groups generally having from 1 to 10 carbon atoms and including branched alkyl groups such as isobutyl radicals, 2-ethyl hexyl radicals and the like).

The polymeric system can be contacted with the Lewis acid in solution by dissolving the polymer in a suitable solvent such as hexane, heptane, decane, hexadecane, cyclohexane, tetrahydronaphthalene, benzene, toluene, xylene, tetrachloroethylene, chlorobenzene, α-chloronaphthalene, and the like, and then adding a quantity of the catalyst optionally dissolved in a small amount of solvent, to the mixture. In general, this procedure is carried out at elevated temperatures, which are necessary to dissolve the polymer. The time required for reaction depends on the temperature, on the particular Lewis acid selected, on the amount of 5-methylene-2-norbornene copolymerized in the copolymer and upon the degree of crosslinking desired but is generally of the order of a few minutes.

In a preferred embodiment of the invention, the polymer is treated in the solid state with a Lewis acid which is gaseous at atmospheric pressure and at ambient temperatures, of which boron trifluoride is preferred since it is relatively easy to handle and is readily available. The copolymer may be in fabricated form such as sheet, film, fiber, filament, wire coating and the like. Preferably, the article should have a thin (i.e., less than 100 mil) cross section since this permits rapid permeation of the gaseous reagent through the body of the article. It will be realized, however, that this procedure may be applied to thicker articles provided they are exposed to the gaseous Lewis acid for a time sufficient to allow permeation to occur throughout the body of the article.

Treatment of the 5-methylene-2-norbornene containing copolymers with the gaseous Lewis acid can be conducted at room temperature and at atmospheric pressure. Pressures higher or lower than atmospheric pressure may also be used. Elevated temperatures including temperatures above the crystalline melting point of the copolymer, but of course below degradation temperature, can also be employed.

The amount of Lewis acid required should generally be at least the stoichiometric equivalent of the 5-methylene-2-norbornene contained in the copolymer.

The invention is further illustrated by the following examples which are not intended to limit its scope.

Example I

A copolymer of ethylene and 5-methylene-2-norbornene was made by placing 200 mls. of decahydronaphthalene in a pressure vessel, purging with pure ethylene, then heating to 110° C. 0.4 ml. of a solution of titanium trichloride containing a total of 2 millimols of the transition metal halide was then added, together with 6 millimols of triisobutyl aluminum dissolved in decalin and 10 mls. of 5-methylene-2-norbornene. Maintaining the temperature at 110° C., the vessel was pressured with 50 p.s.i. of ethylene. After 15 minutes, the vessel was cooled and the pressure relieved. The contents of the vessel were then poured into methanol and the white precipitated polymer was filtered and washed with further quantities of methanol. The weight of the product was 4.1 gm. Infrared absorption spectra showed that copolymerization had taken place at the endocyclic double bond, the copolymer containing approximately 6 mole percent of the 5-methylene-2-norbornene. The stiffness of the copolymer was 111,000 p.s.i. and the density was 0.989.

Two grams of the ethylene/5-methylene-2-norbornene copolymer were dissolved in 100 mls. of xylene at reflux temperature. 0.5 millimol of titanium trichloride was then added to the stirred solution. As each drop of the catalyst hit the solution, it appeared as if instantaneous polymerization occurred. Upon cooling, the main portion of the polymer separated in a gel-like mass, which was filtered, washed with methanol and acetone, then dried. An infrared scan showed that the vinylidene concentration had been reduced 37%. The polymer could be pressed into a tough chip using a heated hydraulic press.

Example II

A one gram sample of the ethylene/5-methylene-2-norbornene copolymer, described in Example I, in the physical form of fluff was placed in a bottle. The bottle was flushed with $BF_3$, then permitted to stand at room temperature for 15 minutes. The polymer was then washed with acetone and dried. An infrared spectrum showed that the intensity of the 6.0μ absorption band of the vinylidene group had decreased by 40% indicating that extensive polymerization had taken place through the vinylidene group. A sheet was hot pressed in a hydraulic press. This sheet had a stiffness of 117,000 p.s.i. and did not dissolve or lose its shape after exposing it to boiling xylene for 2 hours.

The procedure was repeated with further 1 gram batches of ethylene/5-methylene-2-norbornene copolymer made by a procedure substantially the same as in Example I, except that in one case the polymer fluff was exposed to $BF_3$ vapor for 10 minutes and in the other case for 16 hours. The first batch could be pressed into a sheet, and showed a reduction of 38% in vinylidene absorption. The second batch showed an 80% reduction in the $6.0\mu$ vinylidene absorption and could only be molded with great difficulty, indicating that the polymer had very poor flow properties and had been extensively crosslinked.

*Example III*

2.0 grams of an ethylene/5-methylene-2-norbornene copolymer, prepared essentially by the procedure described in Example I, was dissolved in 150 mls. of xylene at the reflux temperature. 1.0 ml. of 1 M $SnCl_4$ solution in a hydrocarbon solvent was then added and the mixture was held at reflux temperature for 1 hour, then cooled, the precipitate filtered, washed with acetone and dried.

A film was pressed and the infrared spectrum of the polymer was taken. The film exhibited no absorption bands at $6.0\mu$ and $11.4\mu$ indicating that the crosslinking reaction had removed substantially all of the vinylidene groups.

Inasmuch as some of the ingredients employed to make catalysts for the manufacture of copolymers are themselves Lewis acids capable of crosslinking the material, the catalyst used to manufacture the copolymers from 5-methylene norbornene and olifinic monomers should be formed prior to conducting the polymerization in order to avoid premature and uncontrolled crosslinking.

The crosslinking method of the present invention is particularly valuable since it employs stable reagents which have an excellent shelf-life and which present minor safety problems.

I claim:
1. A method for crosslinking an olefin copolymer containing 5-methylene-2-norbornene copolymerized therein which comprised intimately contacting the said copolymer with a Lewis acid selected from the group consisting of titanium trichloride, zirconium trichloride, tin tetrachloride, tin tetrabromide, aluminum trichloride, boron trifluoride, diborane, and aluminum trialkyls generally having from 1 to 10 carbon atoms.
2. The method of claim 1 in which the said olefin copolymer is ethylene/5-methylene-2-norbornene.
3. Method of claim 1 in which the said copolymer contains from 0.1 to 12 mole percent of 5-methylene-2-norbornene.
4. A method for crosslinking articles of an olefin copolymer containing from 0.1 to 12 mole percent of 5-methylene-2-norbornene copolymerized therein which comprises exposing the said copolymer to boron trifluoride vapor.
5. The method of claim 3 in which the said copolymer is an ethylene/5-methylene-2-norbornene copolymer.

References Cited
UNITED STATES PATENTS

| | | | |
|---|---|---|---|
| 3,093,620 | 6/1963 | Gladding | 260—79.5 |
| 3,093,621 | 6/1963 | Gladding | 260—80.5 |

JOSEPH L. SCHOFER, *Primary Examiner.*

L. EDELMAN, *Assistant Examiner.*